US008352380B2

(12) United States Patent
Canard et al.

(10) Patent No.: US 8,352,380 B2
(45) Date of Patent: Jan. 8, 2013

(54) METHOD AND SYSTEM FOR GENERATING A LIST SIGNATURE

(75) Inventors: Sebastien Canard, Caen (FR); Marc Girault, Caen (FR); Jacques Traore, Saint Georges des Groseillers (FR)

(73) Assignee: France Telecom, Paris (FR)

( * ) Notice: Subject to any disclaimer, the term of this patent is extended or adjusted under 35 U.S.C. 154(b) by 1091 days.

(21) Appl. No.: 11/596,548

(22) PCT Filed: May 18, 2005

(86) PCT No.: PCT/FR2005/001248
§ 371 (c)(1),
(2), (4) Date: Nov. 15, 2006

(87) PCT Pub. No.: WO2005/122466
PCT Pub. Date: Dec. 22, 2005

(65) Prior Publication Data
US 2008/0046310 A1   Feb. 21, 2008

(30) Foreign Application Priority Data

May 19, 2004  (EP) .................................... 04291288
May 19, 2004  (EP) .................................... 04291289

(51) Int. Cl.
*G06Q 99/00* (2006.01)
*H04L 9/00* (2006.01)
(52) U.S. Cl. .............................. 705/75; 705/12; 713/180
(58) Field of Classification Search .................... 705/50, 705/64, 75, 12; 713/180
See application file for complete search history.

(56) References Cited

U.S. PATENT DOCUMENTS

| 6,704,870 | B2 * | 3/2004 | Vanstone et al. .............. 713/180 |
| 7,142,674 | B2 * | 11/2006 | Brickell .......................... 380/44 |
| 7,159,113 | B1 | 1/2007 | Taniguchi et al. |
| 7,409,552 | B2 * | 8/2008 | Buttyan et al. ................. 713/172 |
| 7,822,689 | B2 * | 10/2010 | Camenisch ...................... 705/71 |
| 2001/0011351 | A1 | 8/2001 | Sako |
| 2001/0034640 | A1 * | 10/2001 | Chaum .......................... 705/12 |

(Continued)

FOREIGN PATENT DOCUMENTS

| FR | 2834403 | 7/2003 |
| FR | 2842680 | 1/2004 |
| JP | 2000305995 A | 11/2000 |
| WO | WO02/067493 A2 * | 8/2002 |
| WO | WO03/090429 A1 * | 10/2003 |

OTHER PUBLICATIONS

Farrell et al. ("An Internet Attribute Certificate Profile for Authorization", RFC 3281, Network Working Group, The Internet Society and the Internet Engineering Task Force, Apr. 2002, 28 pages).*

(Continued)

*Primary Examiner* — James D Nigh
(74) *Attorney, Agent, or Firm* — Harness, Dickey & Pierce, PLC (57) ABSTRACT

The invention relates to a method for generating a list signature for a message to be signed, said method comprising steps which are carried out by an electronic material support of a member of a list. During said step, the electronic material support only generates an electronic signature according to a sequence number supplied to the electronic material support by a certifying authority, according to evidence of belonging to the list of members, to data relating to the electronic material support, and optionally to a key of an authority qualified to lift the anonymity of the generated signature.

19 Claims, 4 Drawing Sheets

U.S. PATENT DOCUMENTS

| | | | |
|---|---|---|---|
| 2002/0194476 A1* | 12/2002 | Lewis et al. | 713/169 |
| 2003/0041244 A1* | 2/2003 | Buttyan et al. | 713/172 |
| 2003/0074330 A1* | 4/2003 | Asokan et al. | 705/80 |
| 2003/0120925 A1* | 6/2003 | Rose et al. | 713/176 |
| 2003/0233550 A1* | 12/2003 | Brickell | 713/171 |
| 2004/0266533 A1* | 12/2004 | Gentles et al. | 463/42 |
| 2005/0081038 A1 | 4/2005 | Arditti Modiano et al. | |
| 2005/0102522 A1* | 5/2005 | Kanda | 713/176 |
| 2006/0015737 A1 | 1/2006 | Canard et al. | |
| 2007/0244833 A1* | 10/2007 | Camenisch | 705/71 |
| 2007/0256125 A1* | 11/2007 | Chen et al. | 726/18 |

OTHER PUBLICATIONS

G. Ateniese et al; A Practical and Provaby Secure Coalition-Resistant Group Signature Scheme; Crypto 2000; LNCS 1880, pp. 255-270.

J. Camenisch et al; Efficient Group Signature Schemes for Large Groups; Aug. 17, 1997, pp. 410-424.

Japanese Office Action (priority application) dated Apr. 12, 2011 (partial translation).

* cited by examiner

METHOD AND SYSTEM FOR GENERATING A LIST SIGNATURE

FIELD

The present invention relates to the field of message electronic signatures requiring cryptographic techniques.

It is notably but not exclusively applied to voting, surveying, tendering electronic services, or to any form of anonymous competition. It is also applied to controlling access to paying services such as transportation services, cinema services, by means of an access ticket, allowing the user to access the service for a limited number of times. As soon as the number of accesses has reached a limiting value, he/she should no longer be able to use his/her ticket. In this type of applications, it not necessary to know the identity of the user. It is sufficient for him/her to be able to prove during an access that he/she has right of access.

BACKGROUND

Electronic signature is a mechanism coming under so-called asymmetrical or public key cryptography. In this mechanism, the signatory has a secret or private key and an associated public key. He/she produces the signature of a message by applying to it a cryptographic algorithm using his/her secret key. The verifier may verify the signature by applying the same cryptographic algorithm using the corresponding public key.

The concept of group signature has also been proposed, which allows each member of a group to produce a signature such that a verifier having an adequate public key may verify that the signature was emitted by a member of the group without being able to determine the identity of the signatory. This concept is for example described in documents:

[1] "A Practical and Provably Secure Coalition-Resistant Group Signature Scheme" of G. Ateniese, J. Camenisch, M. Joye and G. Tsudik, in M. Bellare, Editor, Advance in Cryptology—CRYPTO 2000, Vol. 1880 of LNCS, p. 255-270, Springer-Verlag 2000;

[2] "Efficient Group Signature Scheme for Large Groups", J. Camenisch, M. Stadler, in B. Kalishi, Editors, Advances in Cryptology—EUROCRYPT 97, Vol. 1294 of LNCS, p. 410-424, Springler-Verlag, 1997.

The general principle at the basis of the group signature concept is to associate with each member of the group, a distinct solution to a common difficult problem, this solution being provided by a qualified certifying authority to each new member of the group upon his/her registration. During his/her registration, the member calculates a signature private key which is specific to him/her and interacts with the certifying authority in order to obtain his/her own solution to this difficult problem. The member and the certifying authority also calculate a member certificate which is strongly related to the private key of the member and possibly to the solution of the problem known to the member. To sign a message on behalf of the group, the member encrypts his/her certificate with the public encryption key of the certifying authority, and proves that he/she knows a group member private key, a solution to the difficult problem and a member certificate associated with plain text included in the encrypted text (evidence of belonging to the group). The basis here is cryptography and more particularly evidence of knowledge in order to obtain the desired properties of the group signatures. Verification of a group signature consists of verifying the evidence of knowledge; opening the signature merely consists of decrypting the certificate.

However, in this group signature concept, a certifying authority may at any moment lift the anonymity of the signatory, i.e., determine the identity of the person of the group who has emitted a signature. Further, this type of signature is said to be "non-linkable", i.e., it does not allow any determination whether or not two signatures were emitted by the same person without lifting the anonymity of the signature. The group signature concept is therefore not very suitable for electronic voting.

There also exists what are called list electronic signatures allowing the members of a list to produce a signature such that a verifier may recognize that the signature was produced by a member of the list, without being able to determine the identity of the member. According to the list signature concept, which is for example described in Patent Application FR 2 842 680 filed by the applicant, the time is divided into sequences marked by a sequence representative with a pre-defined validity period. During a sequence, each member of the list is authorized to produce the signatures from which a verifier may determine whether or not two signatures were emitted by the same member of the list, without being able to access the identity of the signatory. Thus, if a member of the list produces two signatures during the same sequence, this may be detected without being able to determine the identity of the signatory.

The list signature is thus well suited for voting or electronic surveying, because each voter may produce a list signature of his/her vote, which guarantees his/her anonymity, while the votes emitted by the same person during a same given election (sequence) may be detected. The list signature is also well suited for access tickets such as transportation tickets or cinema tickets, because the user may produce at each access to which he/she is entitled, a list signature which guarantees his/her anonymity, while the number of signatures already emitted during a given sequence may be determined, so as to authorize him/her to access the service for a certain number of times corresponding to the paid amount. However, certain list signatures are said to be "openable", i.e. a certifying authority may determine the identity of the signatory from a signature.

More specifically, each member of a list calculates during his/her registration in the list, a private key and obtains from a certifying authority a certificate of member of the list, as well as a solution to a difficult problem. The list signature concept does not allow anonymity to be lifted; it does not include any encryption upon producing a signature. At the beginning of a given sequence, the certifying authority generates a sequence representative exclusively valid for the duration of the sequence. Upon producing a signature, a member of the list provides, as in the group signature, the evidence that he/she knows a private key, a solution to a difficult problem and a certificate of member of the list. He/she also calculates a power of the representative of the sequence for which the exponent is the private key. For a given sequence, it is possible to link two signatures produced by a same member of the list, as the representative of the sequence and the private key are set for this sequence. Therefore, the number of signatures emitted by each of the members of the list during a same sequence may thus be counted.

The major drawback of all these concepts results from the fact that they require significant calculations. Indeed, for each generated signature, it is necessary to produce pieces of evidence of knowledge which apply many modular exponentiations in practice, and are very costly in computing time, notably for generating random numbers: a chip card equipped with a cryptographic processor takes about 1 second per modular exponentiation.

A solution to this problem of computing time cost was proposed for group signatures in Patent Application FR 2 834 403 filed by the applicant. This solution which consists of applying a chip card (cryptographic processor), has the disadvantage of the group signatures, i.e., it is not possible to link the signatures emitted by a given member without lifting the anonymity of the signature.

SUMMARY

The object of the present invention is to suppress these drawbacks. This goal is achieved by providing a method for generating a list signature concerning a message to be signed, comprising steps executed by an electronic hardware support of a member of a list, during which the electronic hardware support generates an electronic signature from the message to be signed, and emits the generated signature. According to the invention, the electronic signature is only generated according to the message to be signed, to a sequence number provided by a certifying authority to the electronic hardware support, to evidence of belonging to the list of members, to data specific to the electronic hardware support, and optionally a key from an authority qualified to lift the anonymity of the generated signature.

According to one embodiment of the invention, the electronic hardware support generates according to the sequence number, a pseudo-random number used for generating the electronic signature, the generated pseudo-random number exclusively varying according to the sequence number and to data specific to the electronic hardware support.

According to one embodiment of the invention, generation of the pseudo-random number is carried out by means of an encryption function using a secret key stored by the electronic hardware support and specific to the latter.

According to one embodiment of the invention, the pseudo-random number generated from the sequence number is emitted with the generated electronic signature.

According to one embodiment of the invention, the evidence of belonging to the list of members consists of knowing a secret key common to the members of the list.

According to one embodiment of the invention, the electronic hardware support encrypts with an encryption algorithm, by means of the key of the authority qualified to lift the anonymity of the generated signature, an identification code stored by the electronic hardware support, identifying the member having the electronic hardware support, in order to obtain an encrypted identifier which is used for generating the electronic signature.

According to one embodiment of the invention, a pseudo-random number generated from the sequence number is used for encrypting the identification member code.

Preferably, the encrypted identifier is emitted with the generated electronic signature.

According to one embodiment of the invention, the electronic hardware support receives the sequence number associated with a signature of the sequence number, on behalf of a certifying authority, verifies the signature of the sequence number and refuses to generate a new signature if the signature associated with the sequence number is not correct.

According to one embodiment of the invention, the electronic hardware support generates a signature if the number of signatures emitted beforehand is less than or equal to a maximum number of authorized signatures.

According to one embodiment of the invention, the maximum number of emitted signatures is reset upon a change of sequence number.

The invention also relates to an electronic voting method comprising a phase for organizing elections, during which an organizing authority proceeds with generating parameters required for a poll, and assigns to scrutineers, keys with which ballots may be decrypted and verified, a phase for assigning a signature right to each of the voters, a voting phase during which the voters sign a ballot, and a counting phase during which the scrutineers verify the ballots, and calculate the result of the poll according to the content of the decrypted and valid ballot papers.

According to the invention, the method applies a list signature method according to the one defined hereinbefore, for signing the ballots, each voter being registered as a member of a list, a sequence number being generated for the poll, the maximum number of authorized signatures being equal to 1.

The invention also relates to electronic hardware support comprising means for applying the method defined hereinbefore.

According to one embodiment of the invention, the electronic hardware support appears as a cryptographic microprocessor card.

DRAWINGS

A preferred embodiment of the invention will be described hereafter, as a non-limiting example, with reference to the appended drawings wherein.

DETAILED DESCRIPTION

The present invention proposes a list signature method wherein all the authorized persons, i.e., belonging to the list, may produce a signature which is anonymous, and the validity of which may be verified by anybody without having to access the identity of the member of the list who emitted the signature.

Figure 1:
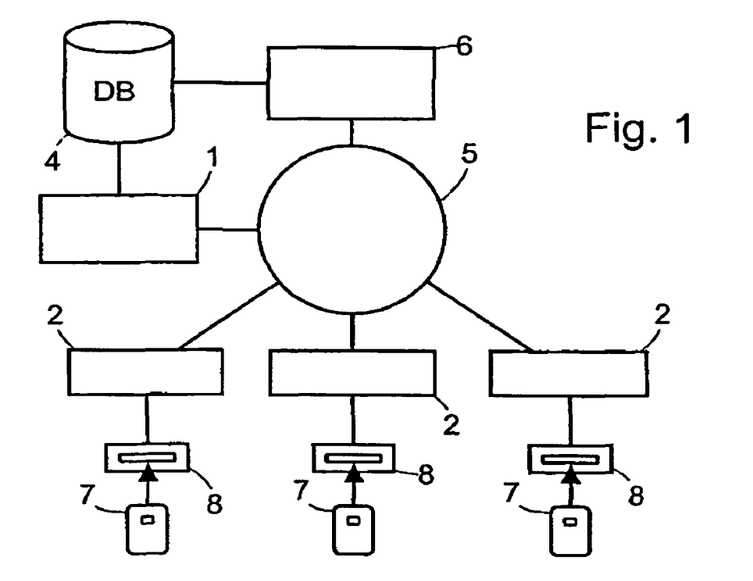
FIG. 1 illustrates a system for applying list signature and electronic voting methods, according to the invention.

Such a method may be applied in the system illustrated in FIG. 1. This system comprises terminals 2 made available to the users and connected to a digital data transmission network 5, such as the Internet network. Each terminal is advantageously connected to a device 8 for reading an electronic hardware support such as a chip card 7. Through the network 5, the users may connect to a server 6 giving access to information for example stored in a database 4. This system also comprises a computer 1 of a certifying authority which notably delivers chip cards 7 to the users.

Moreover, the system according to the invention is based on placing a group signature, as for example described in the aforementioned Patent Application FR 2 834 403, but nevertheless using a symmetrical or asymmetrical encryption algorithm.

The certifying authority responsible for the group generates all the keys and parameters required for placing the selected group signature and places all the public elements of these elements in a directory (for example the database 4).

Figure 2:
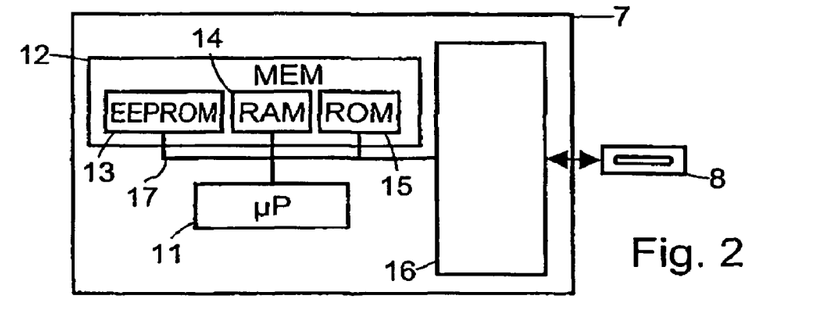
FIG. 2 schematically illustrates the functional element of a chip card which may be used for generating list signatures in accordance with the method according to the invention.

In order to belong to the group, each member has received from the certifying authority, a chip card 7 for example having the functional architecture illustrated in FIG. 2. This architecture comprises:

a microprocessor 11 providing the handling of internal functions and execution of application programs stored in a memory of the card, and which may comprise an optimized cryptographic processor for carrying out cryptographic computations;

memories 12 comprising a read- and write-accessible random access memory 14, with which the processor 11 may record transient data, for example intermediate results of the cryptographic computations, a read only memory 13, for example of the reprogrammable type (EEPROM) and allowing long term storage of data after manufacturing of the card, such as customization data and application programs, a read only memory 15 of the ROM type programmed with unchanging data during the manufacturing of the chip card and notably allowing the internal handling program of the chip card and possibly encryption data stored;

a communication interface 16 through which the card exchanges data with a suitable chip card reader 8, and an internal bus 17 with which the aforementioned elements may be connected together.

The chip card 7 is preferably made secure for preventing access from the outside to certain data notably stored in the ROM memory 15. Further, in order to apply the list signature method according to the invention, the memories 12 of the card contain means for producing a group signature by using a signature algorithm, an identifier $Id_i$ of the member i, a list signature secret key $SK_L$ which is common to all the members of the list, a secret key $SK_i$ only known to the chip card and specific to the latter, as well as means for generating a pseudo-random number.

If the generated list signatures need to be able to be opened by an authority qualified to lift the anonymity, a symmetrical or asymmetrical encryption algorithm is used. This algorithm takes as input, the message to be encrypted, and possibly a pseudo-random number, for example the pseudo-random number $R_i$, which is different every time the algorithm is executed, so as to produce different encrypted texts of a same message every time it is executed. On the other hand, if the pseudo-random number is not changed, the encrypted text obtained for a same message is always the same.

The certifying authority further manages successive sequences of predetermined periods, for each one of which it randomly generates a unique REPSEQ sequence number which should be different from all the sequence numbers generated beforehand and common to all the members of the list. This number is further preferably signed by the certifying authority.

The sequence number is for example obtained from a randomly generated element for which the certifying authority computes a condensate by means of a hash function, for example the SHA-1 function, and formats the result for example by applying the OS2IP function of the PKCS#1, v2.1 standard.

To sign a message M on behalf of the list, a member of the list uses the chip card 7 which was handed over to him by the certifying authority, which receives as input the message M to be signed and the REPSEQ sequence number via a terminal 2 and a chip card reader 8.

Figure 3:
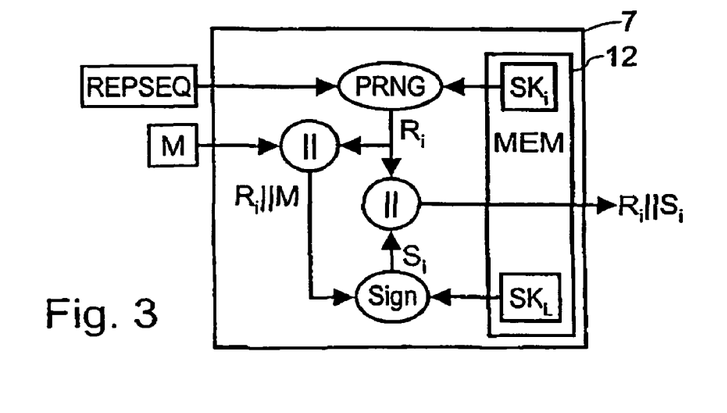
FIG. 3 illustrates as a flowchart, a list signature procedure according to the invention, which is non-openable and executable by the chip card illustrated in FIG. 2.

The chip card then executes the list signature procedure as illustrated in FIG. 3. This procedure consisting of generating a pseudo-random number $R_i$ depending on the chip card, by means of a random number generation function PRNG, receiving as input the REPSEQ sequence number which is in the process of being validated, this input datum being used as a "seed" for the pseudo-random generation function.

In order that the generated pseudo-random number $R_i$ depends on the card, the function is selected so that two different cards of members of the list necessarily produce two different pseudo-random numbers from a same REPSEQ sequence number. Typically, the PRNG function is a generic function for all the chip cards handed over to the members of the list and it also receives as a seed the secret key $SK_i$ specific to the chip card 7.

The list signature procedure executed by the chip card then comprises the execution of a group signature algorithm. This algorithm for example consists of concatenating the message M to be signed with the obtained pseudo-random number $R_i$ and of applying a conventional signature function Sign to the obtained value by using the secret key of list signature $SK_L$ stored by the chip card. The signature S which is delivered at the output by the chip card comprises the pseudo-random number $R_i$ concatenated with the signature value $S_i$ provided by the signature function Sign:

The signature algorithm applied by this procedure may be synthesized by the following formula:

$$R_i = PRNG(SK_i, REPSEQ) \quad (1)$$

$$S_i = \text{Sign}(SK_L, R_i \| M) \quad (2)$$

$$S = R_i \| S_i \quad (3)$$

∥ representing the concatenation operator.

The PRNG function is for example produced with a conventional encryption function, for example of the AES (Advanced Encryption Standard) type, or else with a modular exponentiation which raises the REPSEQ sequence number to the power of $SK_i$ modulo n.

The selected Sign function is for example of the RSA (Rivest, Shamir, and Adleman) type consisting in a transformation of the value $R_i \| M$, followed by raising the amount obtained to the power of $SK_L$ modulo n. The transformation which allows formatting of the value $R_i \| M$ is for example the OS2IP function for converting a string of characters into a positive integer, as provided in the PKCS#1, v2.1 standard.

To check the signature S, it is sufficient to apply to it the group signature verification procedure consisting in the example hereinbefore of raising the signature $S_i$ to the power of $SK_L$ modulo n, to transform the obtained value in order to convert it into a string of characters (I2OSP function of the PKCS#1 standard) and comparing the obtained transformed value to the signed message M. Of course, the verification of the signature also comprises a verification that the value $R_i$ associated with the signature $S_i$ corresponds to the value $R_i$ associated with the message M in the signature.

In order to check if two signatures generated with the same REPSEQ sequence number were emitted by the same member of the list, it is sufficient to compare the numbers $R_i$ associated with the signature of the message $S_i$ in the signature S, these numbers being identical for both signatures S emitted by the same chip card for the same sequence number.

It should be noted that as the number $R_i$ appears in the signature $S_i$ which is generated, it is not necessary to emit it with the latter, except if it is desired that even persons which do not have the list key which allows verification of the signature $S_i$, may link two signatures emitted by the same chip card for a same sequence.

The procedure which has just been described generates a so-called non-openable signature, i.e., it is impossible even for an authority having the required rights to lift the anonymity of the obtained list signature S. If it is desired that the signature be openable, the chip card 7 executes the list signature procedure illustrated in FIG. 4.

Figure 4:
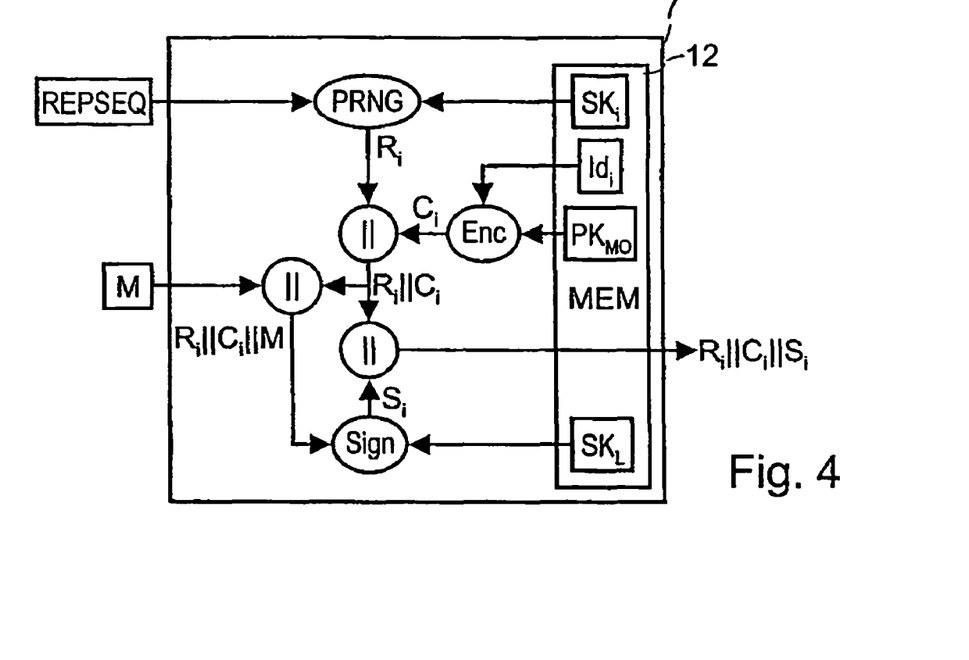
FIGS. 4 and 5 illustrate as flowcharts, list signature procedures according to the invention, which are openable and executable by the chip card illustrated in FIG. 2.

As compared with the procedure described hereinbefore with reference to FIG. 3, this procedure comprises the application of an encryption function Enc to the element $Id_i$ with which the member i of the list having the card may be identified, this element consisting of an identifier or a part of a certificate delivered by a certifying authority which is aware of the link between this certificate part and the actual identity of the member. This encryption uses a public encryption key $PK_{MO}$ which is related to a private decryption key $SK_{MO}$ belonging to the authority qualified to lift the anonymity of a signature emitted by a member of the list. The result of this encryption $C_i$ is concatenated with the pseudo-random number $R_i$ obtained in the same way as in the non-openable list signature procedure; with this concatenation a value $R_i \| C_i$ may be obtained, which is concatenated with the message M before its signature, and possibly with the obtained signature $S_i$.

It should be noted that the encryption of the identifier $Id_i$ may be symmetrical or asymmetrical. If this encryption is asymmetrical, the card stores the public key $PK_{MO}$. If this encryption is symmetrical, the card stores in a secured way a secret key $SK_{MO}$ only known to the authority qualified for lifting the anonymity of the signatures emitted by the members of the list.

The signature algorithm applied by this procedure may thus be synthesized by the following formula:

$$R_i = PRNG(SK_i, REPSEQ) \quad (4)$$

$$C_i = Enc(PK_{MO}, Id_i) \quad (5)$$

$$S_i = Sign(SK_L, R_i \| C_i \| M) \quad (6)$$

$$S = R_i \| C_i \| S_i \quad (7)$$

The PRNG function may also consist in a conventional encryption function, for example of the AES type. The encryption function Enc for example consists in a conventional encryption function, for example of the AES or RSA type receiving as input, the key $PK_{MO}$ and the identifier $Id_i$ of the member i of the list and possibly the pseudo-random number $R_i$.

The signature function Sign for example consists of converting the value $R_i \| C_i \| M$ applied at the input, into an integer number, by means of a function such as OS2IP of the PKS#1 v2.1 standard, and of applying to the obtained converted value M' the function of exponentiation modulo n to the power of $SL_L$:

$$S_i = M'^{SK_L} \pmod{n} \quad (8)$$

This algorithm therefore only comprises a random number calculation and two encryption calculations which may each consist in a simple modular exponentiation.

In order to verify that the signature was emitted by a member of the list, it is sufficient to know the signature function (number n in the example above) and the public key $PK_L$ of the list. In the example, it is sufficient to compute the following value:

$$M'' = S_i^{PK_L} \pmod{n} \quad (9)$$

to convert the value M'' by means of the inverse conversion function I2OSP of the PKS#1 v2.1 standard, and to verify the value obtained with the message M.

In order to determine if two signatures were emitted by the same member of the list, it is sufficient to compare the values of the pseudo-random number $R_i$ contained in both signatures. As in the example described earlier with reference to FIG. 3, it is not necessary to emit the pseudo-random number $R_i$ with the signature S, except if it is desired that even persons which do not have the list key allowing verification of the signature $S_i$, may link two signatures emitted by the same chip card for a same sequence.

It should be noted that the persons who do not have the key $SK_{MO}$ cannot lift the anonymity of the signature.

If the certifying authority desires to lift the anonymity of the signature, it is sufficient that it applies the decryption function corresponding to the encryption function Enc to the value $C_i$ by using the key $SK_{MO}$. With this operation, it is possible to obtain an identifier with which it may then search in its directory (database 4) in order to again find the identity of the signatory member of the list.

Additional security consists of splitting the certifying authority into two distinct entities. The first authority exclusively has the private key $SK_L$ and is not aware of the identifiers $Id_i$ of the members of the list: it is the authority of the list which is involved during registration of a new member to the list. The second authority only has the $SK_{MO}$ key as well as all the identifiers of the members of the list: it is the opening authority which is alone qualified to lift the anonymity of a signature.

The second authority may also be divided into several entities only having a respective part of the opening key $SK_{MO}$ in order to be able to only decrypt a part of an identifier $Id_i$ and an authority establishing the link between an identifier and the identity of the corresponding person.

An alternative which raises the security level consists of assigning a key $SK_{MO\,i}$ respective to each identifier $Id_i$ and only encrypting the pseudo-random number $R_i$ which is used for making the encryption probabilistic. Lifting the anonymity of a signature then consists of testing all the encryption keys $SK_{MO\,i}$ until an identifier $Id_i$ appearing in the directory is obtained.

Thus, if a chip card is corrupted, the hacker only has access to the $SK_{MO\,i}$ of the card without being able to produce a list signature on behalf of an identifier other than the one contained in the card. A hacker will therefore not be able impersonate another member of the list.

It should be noted that if the authority qualified to lift the anonymity of the signatures is the same as the certifying authority handing over chip cards to members of the list, it is not necessary to emit the identifier $C_i$ with the signature S, as the latter appears in the signature associated with the signed message.

Figure 5:
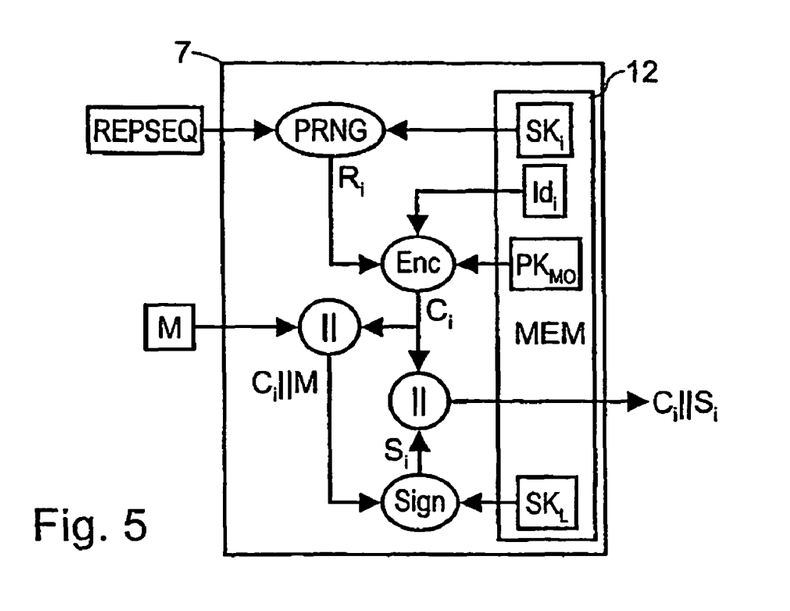
Figure 6:
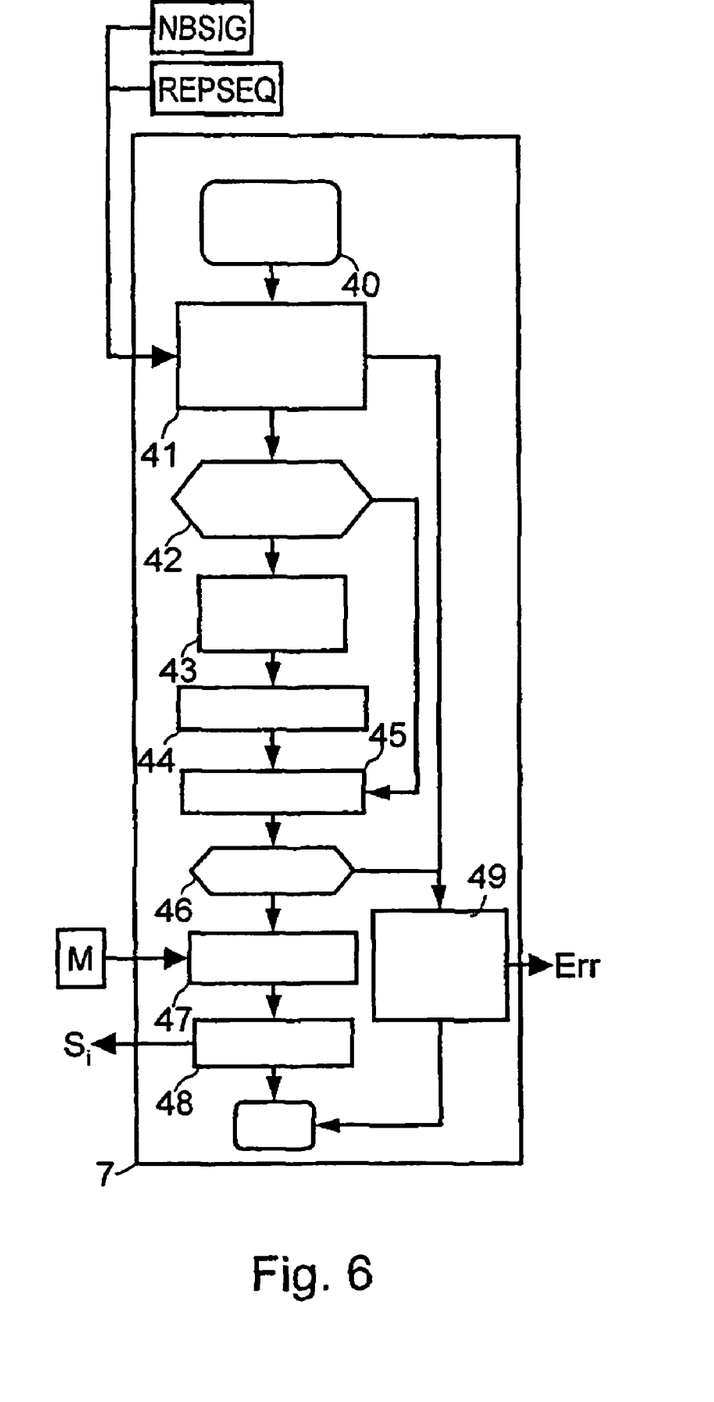
FIG. 6 illustrates as flowcharts, another alternative of list signature procedures according to the invention, executable by the chip card illustrated in FIG. 2.

FIG. 5 illustrates another openable alternative of the list signature method according to the invention.

The procedure illustrated in this figure differs from the one illustrated by FIG. 4 simply by the fact that the pseudo-random number $R_i$ obtained by the PRNG function is used in order to make the encryption function probabilistic, the one applied to the identifier $Id_i$ of the member of the list having the chip card 7, the result $C_i$ of this encryption being concatenated with the message M to be signed and with the generated signature $S_i$. The signature provided by the chip card contains the produced signature $S_i$ concatenated with the encryption value $C_i$.

The signature algorithm applied by this procedure may thus be synthesized by the following formulae:

$$R_i = PRNG(SK_i, REPSEQ) \tag{10}$$

$$C_i = Enc(PK_{MO}, R_i, Id_i)$$

$$S_i = Sign(SK_L, C_i \| M) \tag{11}$$

$$S = C_i \| S_i \tag{12}$$

In this way, the value $C_i$ associated with the signature $S_i$ remains invariant for a same member of the list and a same sequence number. With it, it is therefore possible to determine if two signatures were emitted by a same member of the list.

To raise the anonymity of the signature, it is sufficient to apply to the value $C_i$ the decryption function corresponding to the encryption function Enc, by using the secret key $SK_{MO}$ corresponding to the $PK_{MO}$ key.

As earlier, the encryption function Enc may be symmetrical or asymmetrical. In the first case, a single secret key $SK_{MO}$ is used, which is stored by the chip cards of the members of the list and only known to the authority qualified to open the signatures.

According to another embodiment of the invention, the number of signatures capable of being emitted by the chip card may be set. The chip card then comprises means for emitting an error message during the procedure for emitting a signature when the number of already emitted signatures exceeds a predetermined number.

Figures 7, 8, 9:
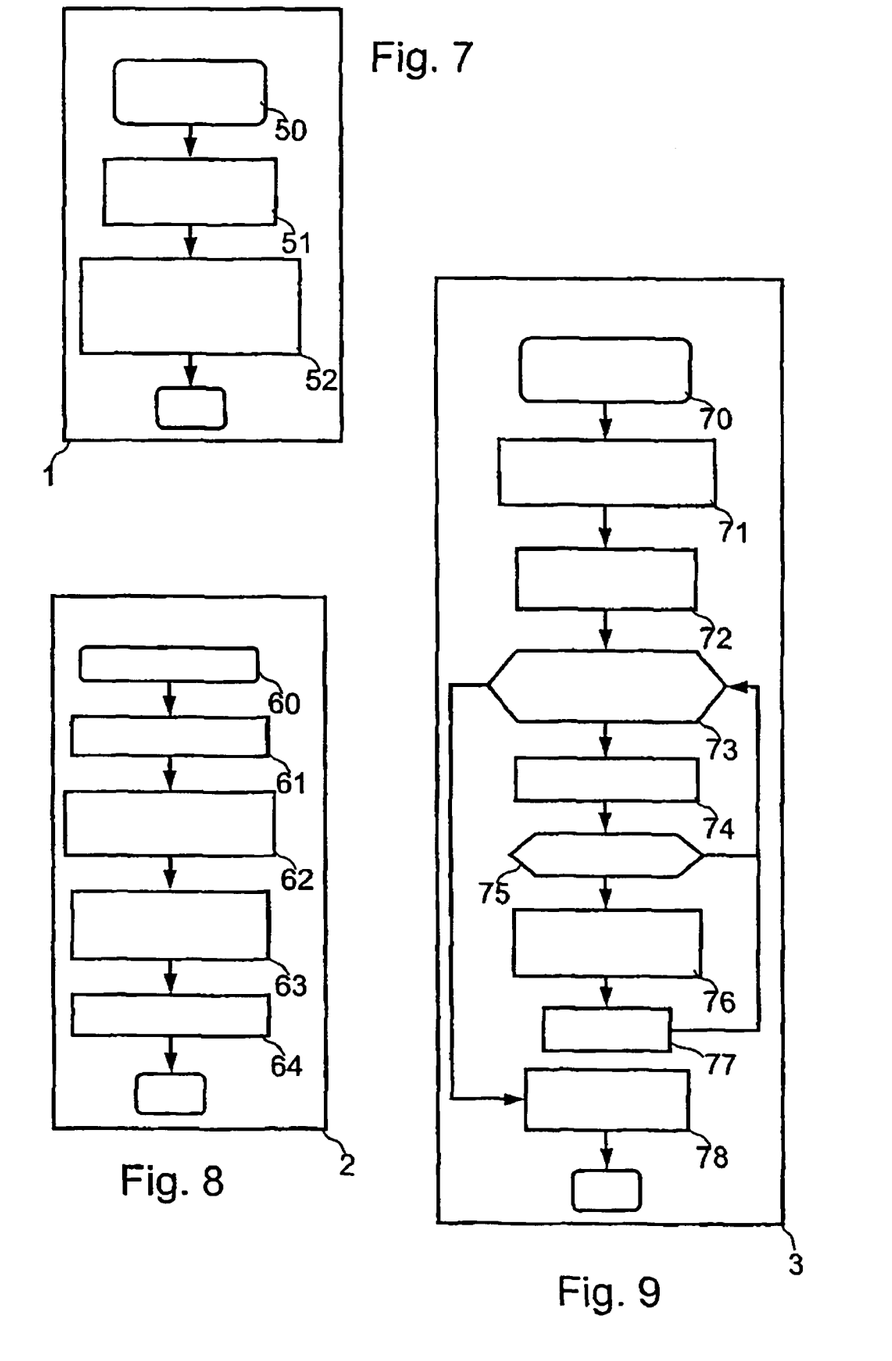
FIGS. 7-9 illustrate as flowcharts, an application of the list signature method according to the invention to electronic voting.

In one embodiment of the invention, the chip card executes the signature generating procedure 40 illustrated in FIG. 7. In this procedure, the number of signatures able to be emitted by the card is set. The chip card then comprises means for emitting an error message during the procedure for emitting one signature, when the number of already emitted signatures exceeds a predetermined number.

During a first step 41 of the procedure 40, the chip card 7 receives the message M to be signed and a REPSEQ sequence number, and verifies the validity of the latter, for example by means of a signature generated by the certifying authority which is transmitted with the sequence number. This verification is carried out with a public key $PK_A$ of the certifying authority, stored by the chip card. If the signature associated with the sequence number is not valid, the chip card emits an error message (step 49) and the procedure terminates 40 without any signature being generated by the card.

If the signature is valid, the chip card proceeds to the following step 42 where it compares the received sequence number with a sequence number stored beforehand in the random access memory 13, and if this number has not been stored beforehand, it stores it in step 43.

In a first alternative, the maximum number of signatures NBSIG capable of being emitted is stored once and for all in the random access memory 13 of the card; this number may depend on the type of the card. Thus, for an application to transportation tickets, cards for 10 passages and others for 20 passages may be provided.

In another alternative, the maximum number of signatures capable of being emitted is transmitted with the sequence number and included in the signature which is verified by the chip card in step 41. In this case, the signature generated by the certifying authority and received by the chip card may concern the sequence number concatenated with the number of authorized signatures and the current date: (REPSEQ∥NBSIG∥date).

In either alternative or in both, the chip card executes an additional step 44 for resetting a CPT counter with the received number of authorized signatures NBSIG at each change of sequence number.

In the following step 45 which is executed in both alternatives described hereinbefore and if the stored sequence number is identical with the received sequence number (step 42), the number of signatures capable of being generated NBSIG is decremented in the read only memory 13. If the obtained number is strictly negative (step 46), the chip card emits an error message (step 49). In the contrary case, the chip card computes in step 47 a signature $S_i$ of the message M according to one of the list signature methods described hereinbefore, and emits the generated signature $S_i$ (step 48).

The card may also manage a different counter per sequence number. Every time the card receives a new sequence number and if need be, a maximum number of signatures NBSIG (if the latter may be different for each sequence number), it resets a CPT counter which is stored in a table in association with the sequence number. When the card receives a sequence number with a message to be signed, it looks up in this table whether the received sequence number is stored therein, and if this is the case, it updates the associated counter in order to take the new generated signature into account.

The list signature method which has just been described may be applied to an electronic voting method. The electronic voting method according to the invention comprises several phases including the execution of the procedures of the list signature method described hereinbefore.

This method involves the intervention of a certifying authority who organizes the elections, who executes for this purpose a procedure 50 for organizing the poll. This procedure consists of generating the data required for the elections to take place properly, a public database accessible to all, in which the ballots are collected. During the organization of the poll, scrutineers are also designated who will count the votes and determine the result of the election.

The organizing authority first of all proceeds with generating the different parameters required for setting up a list signature. The voters must then register beforehand, for example in a town hall on an election list so as to receive a chip card 7 as described hereinbefore, containing all the required data, i.e., an identifier $Id_i$ for the member i, a list signature secret key $SK_L$ which is common to all the members of the list, and a secret key $SK_i$ only known to the chip card and specific to the latter. By means of these parameters, the voters may participate in all future elections.

In step 51 of the procedure 50, the organizing authority also publishes a sequence number m required for setting up a new list signature sequence, so as to prevent the voters for voting (signing) twice in this election.

Moreover, scrutineers responsible for counting the ballots will create 52 the required pairs of public/private keys. So that they should all cooperate in order to be able to decrypt an encrypted message with the public key. For this purpose, the cryptographic system set up is selected so as to allow a voter to encrypt a message (ballot) by means of at least one public key, while imposing cooperation of all the scrutineers to use the corresponding private key(s), and thereby decrypt the message.

The sharing of the decryption private key among all the scrutineers may be performed in the following way.

Let us consider g a generator of the cyclic group G. A respective private key $x_i$ is assigned to each scrutineer i who calculates the number $y_i$ belonging to G such that:

$$y_i = g^{x_i} \tag{1}$$

The public key Y to be used by the voters is obtained by the following formula:

$$Y = \prod_i y_i \quad (2)$$

and the corresponding private key X shared by all the scrutineers i the following:

$$X = \sum_i x_i \quad (3)$$

It is possible to reach a similar result by proceeding with encryption by using all the respective public keys of the scrutineers. The decryption requires knowing all the corresponding private keys.

During the opening of the polling stations, each voter emits a ballot by executing on a terminal a procedure 60. In step 61, the voter selects his/her vote $v_i$ and encrypts the latter by means of the public key of the scrutineers in order to obtain an encrypted ballot $D_j$. Next, he/she signs the encrypted ballot by means of the list signature method in order to obtain a signature $S_i$. The ballot consisting of the set ($D_j$, $S_i$) of the ballot and the signature is then published anonymously in a public database 4.

In step 62, the encryption of the ballot is performed by using an encryption algorithm, such as for example the algorithm of El Gamal or Paillier. If the El Gamal algorithm is applied, the encryption is performed by calculating the following numbers:

$$a_j = v_j Y^r \text{ and } b_j = g^r \quad (4)$$

wherein r is pseudo-random element. The encrypted ballot $v_j$ then consists of the couple $D_j = (a_j, b_j)$. The voter $E_j$ then calculates 63 the list signature of the encrypted ballot $S_j = \text{Sig}_{list}(a_j \| b_j)$, $\text{Sig}_{list}$ being the list signature as described hereinbefore, obtained by his/her chip card 7, and being transmitted to the terminal 2.

The voter $E_j$ has just generated his/her ballot ($D_j$, $S_j$), which is sent 64 to the public database 4 by means of an anonymous transmission channel, i.e., prohibiting the linking of a message transmitted to the emitter of the latter. The voter may for this purpose use a public terminal or a network of mixers.

At the end of the poll, the scrutineers carry out counting the votes by executing the procedure 70 on the terminal 3. This procedure first of all consists of generating 71 the decryption private key X from their respective private keys $x_i$ and by means of formula (3). Next, in step 72, they access the public database 4 of the ballots in order to obtain the ballots ($D_i$, $S_i$) and to decrypt them.

The actual decryption of the ballots consists for each emitted ballot (step 73) of verifying 74 the signature $S_i$ by executing the list signature verification procedure 40 described hereinbefore and if the signature is valid and unique (step 75), of decrypting 76 the encrypted ballot $D_j$ by applying the following formula:

$$v_j = a_j / b_j^x \quad (5)$$

The ballots $v_j$ thereby decrypted and verified with the result of the corresponding verification are introduced 77 into the database 4 of the ballots, in association with the ballot ($D_j$, $S_j$).

The decryption private key X is also published in order to allow everybody to verify the counting of the ballots.

Once all the ballots have been counted, this procedure 70 calculates in step 78 the result of the election and updates the public database of the ballots by writing the result therein, and possibly the decryption private key X.

It is easy to see that the properties stated hereinbefore, required for setting up an electronic voting system, are verified by the method described above. Indeed, each voter can only vote once (the chip card can only emit a single signature for a given sequence number), if the maximum number of signatures likely to be emitted is set to 1.

Next, it is not possible to begin with counting the ballots before the end of the poll, if at least one of the scrutineers observes the rule, as the presence of all the scrutineers is required for counting a ballot. Finally, the result of the election may be verified by everybody as the scrutineers provide in the database all the required elements (in particular the counting private key) in order to proceed with such a verification, and the verification of a signature is accessible to everybody by using the public key $PK_L$ of the certifying authority. Thus, anybody may carry out the counting in the same way as the scrutineers and therefore make sure that it has been carried out properly.

The keys of the scrutineers are of course obsolete at the end of the poll, since they are published.

What is claimed is:

1. A method, executed by an electronic hardware device of a member of a list, for generating an electronic signature based on a message, the method comprising:
    storing, by the electronic hardware device, an individual secret key that is specific to the electronic hardware device;
    storing, by the electronic hardware device, a list secret key that is evidence of belonging to the list and is common to all members of the list;
    receiving, by the electronic hardware device, a sequence number from a certifying authority, wherein the sequence number represents a predetermined period of time and is common to all members of the list;
    generating a random number based on the sequence number and the individual secret key;
    generating the electronic signature based only on the message, the random number, and the list secret key; and
    outputting, by the electronic hardware device, the electronic signature.

2. The method of claim 1 wherein the random number is generated based only on the sequence number and the individual secret key.

3. The method of claim 1 further comprising outputting the random number along with the electronic signature.

4. The method of claim 1 wherein generating the random number is performed using an encryption function.

5. The method of claim 1 wherein the electronic hardware device comprises a cryptographic microprocessor card.

6. The method of claim 1 further comprising:
    receiving, by the electronic hardware device, a signature of the sequence number from the certifying authority;
    verifying the signature of the sequence number; and
    disabling generation of the electronic signature when the verifying indicates that the signature of the sequence number is not correct.

7. The method of claim 6 further comprising:
    receiving, by the electronic hardware device, a numerical limit indicating a maximum number of authorized signatures from the certifying authority;
    maintaining a count of a number of times the electronic signature has been generated; and disabling generation of the electronic signature when the count is greater than or equal to the numerical limit.

8. The method of claim 7 wherein the numerical limit is included in the signature of the sequence number, and wherein the signature of the sequence number is received along with the sequence number.

9. The method of claim 7 further comprising resetting the count when the sequence number changes.

10. A method, executed by an electronic hardware device of a member of a list, for generating an electronic signature based on a message, the method comprising:
   storing, by the electronic hardware device, an individual secret key that is specific to the electronic hardware device;
   storing, by the electronic hardware device, an identifier that is specific to the electronic hardware device;
   storing, by the electronic hardware device, a list secret key that is evidence of belonging to the list and is common to all members of the list;
   storing, by the electronic hardware device, an authority key of an authority qualified to lift anonymity of the electronic signature;
   receiving, by the electronic hardware device, a sequence number from a certifying authority, wherein the sequence number represents a predetermined period of time and is common to all members of the list;
   generating a random number based on the sequence number and the individual secret key;
   generating an encrypted value based on the identifier and the authority key;
   generating the electronic signature based only on the message, the random number, the encrypted value, and the list secret key; and
   outputting, by the electronic hardware device, the electronic signature.

11. The method of claim 10 wherein the random number is generated based only on the sequence number and the individual secret key, wherein the encrypted value is generated based only on the identifier and the authority key, and wherein the authority key is a public key.

12. The method of claim 10 further comprising outputting the random number and the encrypted value along with the electronic signature.

13. The method of claim 10 further comprising:
   receiving, by the electronic hardware device, a signature of the sequence number from the certifying authority;
   verifying the signature of the sequence number; and
   disabling generation of the electronic signature when the verifying indicates that the signature of the sequence number is not correct.

14. The method of claim 13 further comprising:
   receiving, by the electronic hardware device, a numerical limit indicating a maximum number of authorized signatures from the certifying authority;
   maintaining a count of a number of times the electronic signature has been generated; and
   disabling generation of the electronic signature when the count is greater than or equal to the numerical limit.

15. The method of claim 14 wherein the numerical limit is included in the signature of the sequence number, and wherein the signature of the sequence number is received along with the sequence number.

16. The method of claim 14 further comprising resetting the count when the sequence number changes.

17. A method, executed by an electronic hardware device of a member of a list, for generating an electronic signature based on a message, the method comprising:
   storing, by the electronic hardware device, an individual secret key that is specific to the electronic hardware device;
   storing, by the electronic hardware device, an identifier that is specific to the electronic hardware device;
   storing, by the electronic hardware device, a list secret key that is evidence of belonging to the list and is common to all members of the list;
   storing, by the electronic hardware device, an authority key of an authority qualified to lift anonymity of the electronic signature;
   receiving, by the electronic hardware device, a sequence number for a certifying authority, wherein the sequence number represents a predetermined period of time and is common to all members of the list;
   generating a random number based on the sequence number and the individual secret key;
   generating an encrypted value based on the identifier, the random number, and the authority key;
   generating the electronic signature based only on the message, the encrypted value, and the list secret key; and
   outputting, by the electronic hardware device, the electronic signature.

18. The method of claim 17 wherein the random number is generated based only on the sequence number and the individual secret key, wherein the encrypted value is generated based only on the identifier, the random number, and the authority key, and wherein the authority key is a public key.

19. The method of claim 17 further comprising outputting the encrypted value along with the electronic signature.

* * * * *